United States Patent [19]

Yamada

[11] Patent Number: 4,707,828

[45] Date of Patent: Nov. 17, 1987

[54] MULTIACCESS COMMUNICATION SYSTEM

[75] Inventor: Kunihiro Yamada, Tokyo, Japan

[73] Assignee: Ricoh Company, Ltd., Tokyo, Japan

[21] Appl. No.: 774,303

[22] Filed: Sep. 10, 1985

[30] Foreign Application Priority Data

Sep. 11, 1984 [JP] Japan .................................. 59-190150
Sep. 11, 1984 [JP] Japan .................................. 59-190151
Sep. 11, 1984 [JP] Japan .................................. 59-190152

[51] Int. Cl.[4] ............................. H04J 3/02; H04J 3/24
[52] U.S. Cl. ......................................... 370/85; 370/94
[58] Field of Search ................... 370/60, 94, 85, 110.1, 370/86; 340/825.5

[56] References Cited

U.S. PATENT DOCUMENTS

3,764,981 10/1973 Takasugi .............................. 370/85
4,281,380 7/1981 Demesa, III et al. ............ 340/825.5
4,301,532 11/1981 Janetzky .............................. 370/85
4,408,300 10/1983 Shima .................................. 370/85
4,538,263 8/1985 Gabrielli et al. ..................... 370/86

Primary Examiner—Douglas W. Olms
Assistant Examiner—Frank M. Scutch, III
Attorney, Agent, or Firm—Cooper, Dunham, Griffin & Moran

[57] ABSTRACT

A multiaccess communication system includes a common transmission path having a multichannel structure and a plurality of nodes connected to said common transmission path. There is provided an exclusive control channel common to each of said plurality of nodes, and predetermined packets for selecting a channel for data transfer are exchanged in advance between nodes, between which a data communication is desired, through the control channel, thereby establishing a data transferring channel.

45 Claims, 12 Drawing Figures

MULTIACCESS COMMUNICATION SYSTEM

BACKGROUND OF THE INVENTION

1. Field of the Invention

The present invention generally relates to a data communication system, such as a local area network (LAN), and its access method, and, in particular, to a multichanneled multiaccess communication system.

2. Description of the Prior Art

In a bus type communications network, use is typically made of the so-called carrier sense multiple-access (CSMA) method for controlling an access to the network, and, in particular, use is often made of its modification of carrier sense multiple-access, collision detection (CSMA/CD) method, in which a multiple access is carried out while detecting a collision on the transmission line. In the CSMA/CD method, it is known that a relatively excellent performance can be obtained by a simple control; however, in the case where it is applied to a mono-channel architecture, the throughput deteriorates due to repeated collisions under heavy load condition, and, moreover, the delay characteristic becomes impaired thereby limiting the capacity of transmission line and the distance of communication.

For this reason, in order to improve the throughput and the delay characteristic, there has been proposed a modified CSMA/CD method of the distributed control type for use in a multi-channel architecture, which is called the Psi-net method and disclosed in the preprint of the Electronics and Communications Society published on Nov. 22, 1983. The proposed method adopts the distributed control format having a predetermined channel setting and it is so structured that a head end combines packets transmitted through transmitting channels and a receiving channel is constructed as a single channel of large capacity, whereby each station receives a single channel, and a receiver side is provided with a main channel for receiving each channel and a detecting channel for transmitting the transmitting channel as it is to the receiver side, whereby each station intrigues the detecting channel so as to carry out carrier detection and collision detection.

However, such a multiaccess communication means requires the provision of a head end which complicates the overall structure, and, at the same time, the transmission rate of the main channel must be increased as the transmission line capacity increases. For example, it can be easily put into practice if the transmission line capacity is in the order of 10 M bps, but if the transmission line capacity exceeds 100 M bps, the implementation of a transmitter/receiver for ultra high speed channel operation is extremely difficult.

SUMMARY OF THE INVENTION

In accordance with the principle of the present invention, there is provided a multiaccess communication system having a multichannel structure in which an exclusive control channel common to each node in the network is provided, whereby the channel to be used for communication is set by having a channel selecting packet exchanged in advance between selected nodes between which transmission and reception of data is desired through the exclusive control channel.

It is therefore a primary object of the present invention to obviate the disadvantages of the prior art as described above and to provide an improved multiaccess communication system.

It is another object of the present invention to provide an improved multiaccess communication system capable of carrying out packet communication efficiently in a multichannel structure even if the transmission line capacity increases.

It is a further object of the present invention to provide an improved multiaccess communication system reliable in operation and simple in structure.

Other objects, advantages and novel features of the present invention will become apparent from the following detailed description of the invention when considered in conjunction with the accompanying drawings.

DESCRIPTION OF THE PREFERRED EMBODIMENTS

Figure 1:
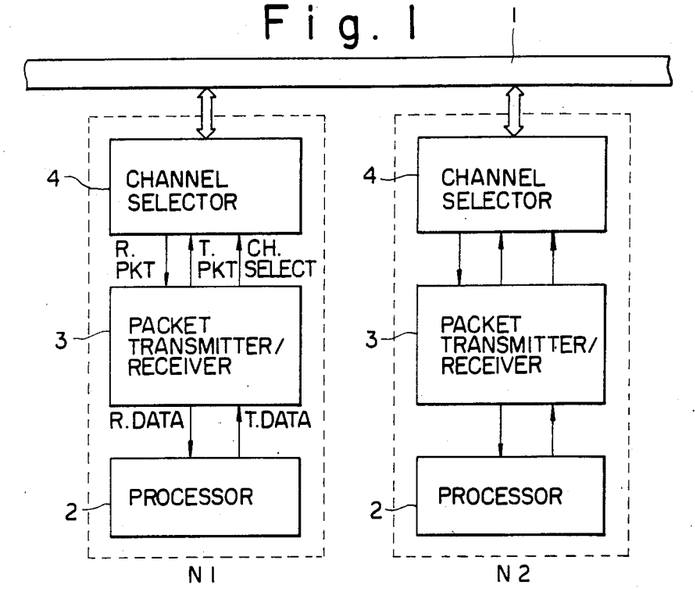
FIG. 1 is a block diagram showing a multiaccess communication system constructed in accordance with one embodiment of the present invention.

Referring now to FIG. 1, there is shown in block form a multiaccess communication system constructed in accordance with one embodiment of the present invention, in which a plurality of nodes N (only node N1 and node N2 are shown) are connected to a common transmission path 1 having a plurality of channels. The common transmission path 1 may be constructed in the form of either a base band transmission path in which a transmitting channel is selected by a plurality of cables or a broad band transmission path in which a transmitting channel is selected by changing the frequency of a carrier in a single cable. Each of the nodes N1 and N2 includes a processor 2, a packet transmitter/receiver 3 which receives transmission data T.DATA and transmits reception data R.DATA to and from the processor 2 and a channel selector 4 which is connected between the common transmission path 1 and the packet transmitter/receiver 3 for switching the transmitting channels in response to a channel selecting signal CH.SELECT supplied from the packet transmitter/receiver 3, thereby receiving a transmission packet T.PKT and transmitting a reception packet R.PKT to and from the packet transmitter/receiver 3 using the channel thus selected.

Figure 2:
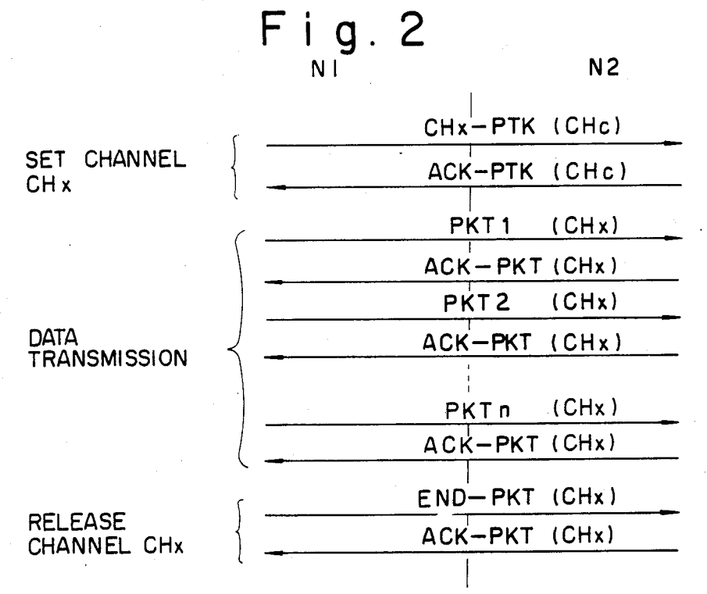
FIG. 2 is a schematic illustration showing several packets which are used in the system of FIG. 1.

The structure shown in FIG. 1 will be described further in detail with reference to FIG. 2 as to the case where the base band CSMA/CD method well known in relation to the Ethernet and IEEE-802.3 standards is applied for the purpose of illustration.

In accordance with the principle of the present invention, a control channel CHc for setting a channel is previously allotted among a plurality of channels in the common transmission path 1. If neither of nodes N1 and N2 is in communication with any other node, i.e., having no session, the control channel CHc is selected by the channel selecting signal CH.SELECT under the control of the packet transmitter/receiver 3 at both of the nodes N1 and N2 so that the control channel CHc is in a reception standby state.

Figure 3:
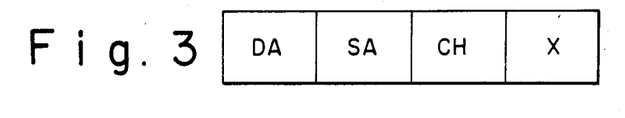
FIG. 3 is a schematic illustration showing the format of a channel designating packet.

Under the condition, for example, if data is to be transferred from node N1 to node N2, in the first place, a channel designating packet CHx-PKT (first packet) for designating a particular channel CHx for use in transmitting data this time among a plurality of data transmitting channels is transmitted from node N1 to node N2 via the control channel CHc. The format of this channel designating packet CHx-PKT is shown in FIG. 3. As shown, this packet CHx-PKT includes a destination address DA, a source address SA, a channel designating control field CH and channel designating information X. The channel designating packet CHx-PKT supplied from node N1 is received by all of the nodes having the reception standby state and connected to the common transmission path 1, but only node N2 whose address agrees with the destination address DA of the packet takes in this packet CHx-PKT into its packet transmitter/receiver 3. In the node N2 having received the first packet, a buffer is prepared in its processor 2, and if the packet transmitter/receiver 3 is in a READY state capable of carrying out data transfer in succession, the node N2 transmits to node N1 through the control channel CHc an acknowledge packet ACK-PKT (second packet) having the address of node N1 as its destination address and indicating the channel to be used for data transfer to the designated channel CHx.

Figure 4:
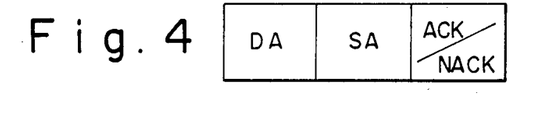
FIG. 4 is a schematic illustration showing the format of an acknowledge/non-acknowledge packet.

On the other hand, if the designated channel CHx is not usable at the node N2, the node N2 transmits a negative acknowledge packet NACK-PKT to the node N1 through the control channel CHc. Upon receipt of this negative acknowledge packet NACK-PKT, the node N1 again transmits another channel designating packet CHx'-PKT designating another channel CHx' for data transfer to the node N2 to check as to whether this channel CHx' is available or not. FIG. 4 shows the format of this acknowledge and negative acknowledge packet ACK-PKT and NACK-PKT.

Upon transmitting the acknowledge packet ACK-PKT to the node N1, at the node N2, under control of the packet transmitter/receiver 3, the channel selecting signal CH.SELECT is switched so that the selected channel in the channel selector 4 is switched to the designated channel CHx. On the other hand, upon receipt of the acknowledge packet from the node N2, at the node N1, the channel selecting signal CH.SELECT is switched thereby selecting the channel CHx. In this manner, a transmission line through the channel CHx for data transmission between the nodes N1 and N2 is established.

Thereafter, using the channel CHx thus selected, required data are transmitted from the node N1 to the node N2 packet by packet according to the CSMA/CD method. In this case, when the node N2 receives each of packets PKT1 through PKTn having data from the node N1, the node N2 transmits its acknowledge packet ACK-PKT to the node N1. Upon completion of transfer of a series of data, the node N1 transmits a session end packet END-PKT indicating the end of communication to the node N2. Thus, when the node N2 receives this session end packet END-PKT, it transmits an acknowledge packet ACK-PKT, and, then, under control of the packet transmitter/receiver 3, the channel selecting signal CH.SELECT is switched so that the original control channel CHc is reset by the channel selector 4. On the other hand, at the node N1, when the node N1 receives an acknowledge packet ACK-PKT from the node N2 as a response to the end of session, the original control channel CHc is restored by the channel selector 4 thereby establishing the reception standby state for channel designation.

It is to be noted that when the channel CHx is established between the nodes N1 and N2 due to the channel designation from the node N1, data transfer can be carried out not only from the node N1 to the node N2, but also from the node N2 to the node N1, if desired.

It is also to be noted that the embodiment described above is so structured that if the designated channel CHx is not usable when the node N2 has received the channel designating packet CHx-PKT as the first packet from the node N1, the node N2 transmits the negative acknowledge packet NACK-PKT as the second packet thereby waiting to receive another channel designation from the node N1. However, as an alternative measure, the following channel designation method may be adopted.

That is, even if the channel CHx designated by the channel designating packet CHx-PKT from the node N1 is not usable, if any other channel CHx' is usable for the same purpose, then the node N2 transmits a channel designating packet CHx'-PKT designating its channel CHx' as the second packet to the node N1 instead of the negative acknowledge packet NACK-PKT, thereby providing a channel alteration request to the node N1, and, thereafter, the channel of itself is switched to the channel CHx'. When the node N1 has received the channel designating packet CHx'-PKT for channel alteration request, it switches its channel to CHx' thereby establishing a data transmission path between the nodes N1 and N2. If the node N2 is in BUSY state and thus cannot receive data transmitted from the node N1, for example, because it has no usable channel or cannot prepare a buffer, the node N2 transmits the negative acknowledge packet NACK-PKT as the second packet to the node N1 as mentioned before.

Furthermore, as another channel designating method, instead of transmitting an acknowledge packet ACK-PKT to the node N1 upon receipt of the channel designating packet CHx-PKT as the first packet, the second packet transmitted by the node N2 to the node N1 may be a packet which is the same channel designating packet CHx-PKT having an indication of permission to receive, which is another channel designation packet CHx'-PKT requesting a channel alteration to another usable channel CHx' if the designated channel CHx is not usable, or which is the control channel designating packet CHc-PKT designating the control channel and having an indication of rejection of reception if there is no other usable channel or the BUSY state exists. In this case, after transmission of an appropriate channel designating packet from the node N2 to the node N1, the node N2 sets its own channel to the designated channel CHx, to the alteration-requested channel CHx' or to the control channel. At the side of node N1, upon receipt of the channel designating packet from the node N2, in accordance with the contents of the packet thus received, the node N1 sets its own channel to either one of CHx, CHx' and CHc. In this instance, if the control channel CHc is set, since the node N2 is in the reception rejection state, the node N1 does not proceed to transmission of data. If it is required to discriminate as to whether the channel designating packet CHx-PKT, CHx'-PKT or CHc-PKT transmitted from the node N2 to the node N1 is a command or a response, an exclusive bit making distinctions between command and response may be provided in the packet, or the code in the control field of the packet may be selectively set, for example, as CH for command and CH' for response.

Figure 5:
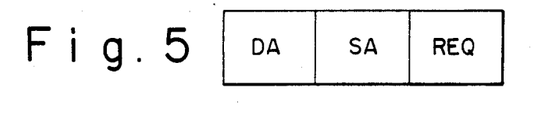
FIG. 5 is a schematic illustration showing the format of a channel request packet.

As different from the above-described embodiment in which the access of channel designation is carried out from the node N1, the present invention may also be so structured that the node N1 transmits a channel request packet REQ-PKT, which make inquires of communication to the node N2, as the first packet, and, upon receipt of this packet, the node N2 transmits a packet CHx-PKT, which designates the channel CHx usable at the node N2, to the node N1 as the second packet, thereby setting the channel. In this case, after transmission of the channel designating packet CHx-PKT, the node N2 switches its own channel to CHx, and the node N1, which has received the channel designating packet CHx-PKT from the node N2, switches its own channel to CHx according to this designation, thereby establishing a data transmission path between the nodes N1 and N2. FIG. 5 illustrates the format of the channel requesting packet REQ-PKT.

Such an embodiment is particularly useful in a situation, for example, where the node N2 is a center computer and it receives a call from the node N1 acting as a slave unit, whereby a dedicated channel CHx is previously set in the node N2 and the access is made only through this set channel CHx. If the node N2 includes a plural sets of packet transmitter/receiver units 3 and channel selectors 4, the processor 2 of the node N2 is used to search for an available channel CHx and this available channel CHx is designated to the node N1, thereby allowing the channel CHx to be used only for data transmission between the nodes N1 and N2. In this structure, there is no need to carry out a multiaccess operation on the channel CHx and data transfer can be carried out exclusively through the channel CHx at high speed. In this case, the communication protocols for the control channel CHc and the designated channel CHx may differ from each other.

Now, in each of the above-described embodiments, the specific manner of designating a channel CHx or CHx' for use in data transfer will be described hereinbelow.

As one method, designating the total number of channels for use in data transfer by n, the channel designation is made using a random number generator which produces the designated channel number x at random uniformly in a range of x being equal to or larger than n and equal to or smaller than unity. Such a random number generator is normally provided at the side of the node which designates the channel CHx or CHx'.

Such a random channel designating method is particularly advantageous in the case where the number of connecting nodes is large. Suppose that the number of nodes is 2,000 with the number m of channels being 100 and the number of session is unity for each node wherein the mode of communication between nodes is a one-to-one communication, then the total of 1,000 sessions is distributed over 100 channels. That is, for each channel, 1,000/100=10 (sessions/channel), and, thus, 10 sessions (20 nodes) are allocated on the average. Thus, in the average of 10 sessions, each channel is subjected to multiaccess operation by the CSMA/CD method. According to the prior art, it was extremely difficult for 2,000 nodes to access a single channel of ultra high speed at 200 M bps. On the other hand, in accordance with the present invention, since provision is made of a multichannel structure, each channel has a data transmission rate of 200/100=2 (M bps/channel) which can be realized with ease.

As another channel designating method, instead of designating one out of the total number of channels at random uniformly, several channel groups are formed according to communication service classes, whereby a channel group is first selected in accordance with a particular service class and then a desired channel number is selected from the selected group. In this case, when selecting the channel number in the selected channel group, the before-mentioned random selection method may be advantageously applied. However, some channel groups may have the channel number which is unity. Furthermore, the use of channels may have a priority depending on the service classes. In this case, the random numbers generated by the random number generator are not uniform, but they are biased depending on the service classes.

In the multiaccess communication system embodying the present invention as described above, it is so structured that multiaccess is carried out by the CSMA method in each of the channels; however, it goes without saying that use may also be made of other access methods, such as Token method, TDMA method and Polling method. When the TDMA or Polling method is to be applied, the node N2 may be structured as a control station.

Besides, regarding the access method in the control channel, other than the CSMA and Token methods, use may also be made of the well-known single channelmultiaccess method. However, in the case where it is not all of the connection nodes which have a dedicated transmitter/receiver for use with the control channel CHc and the transmitter/receiver is shared by the control channel CHc and the data transferring channel CHx, the transmission/reception of control channel CHc cannot be carried out while the channel CHx is in use so that, for example, if the Token method is used, the operation for causing its node to be released from or participating in the control channel CHc must be carried out each time when the session is set or released; whereas, in a contention type communication method, such as the CSMA or CSMA/CD method, such an operation is not required, and, thus, in such a case, the contention type communication method is preferred.

Furthermore, in accordance with the present invention, it is only required that the the access method on the data transferring channel CHx be determined between nodes which access the channel CHx. To access this data transferring channel CHx by a contention type communication method, such as the CSMA or CSMA/CD method, is most preferred. That is, if the conventional CSMA method is applied to a high speed single channel, as pointed out in the before-mentioned article, the throughput and delay characteristic deteriorate due to the so-called CSMA effect stemming from the reciprocating propagation time delay for the transmission time corresponding to the packet length. However, for the identical total transmission capacity, the throughput and delay characteristic may be remarkably improved by providing a low speed, multichannel structure.

The above description has been made for the case in which the session has been set properly. Now, in what follows, it will be described as to the case where abnormality occurs during setting a session.

If an abnormality in transmission occurs when the node N1 transmits the first packet or the node N2 does not receive the first packet, for example, because the node N2 has not been set to the control channel CHc, the node N1 determines the occurrence of abnormality by the fact that it has not received the second packet from the node N2 within a predetermined time period and thus it executes a retrial. Furthermore, while the node N2 with its channel CHx being set is in a reception standby state for the data packet PKT1 from the node N1, if the data packet PKT1 has not been received within a predetermined time period, the node N2 determines the occurrence of abnormality in transmission during transmission of the second packet or data packet PKT1. In this case, the node N2 resets its channel to CHc thereby allowing to wait for the retrial from the node N1. In addition, if any of acknowledge packet ACK-PKT, data packet PKT2 - PKTn and session end packet END-PKT has not been transmitted within a predetermined time period from the node N1 or N2 in communication, the occurrence of abnormality in transmission can be determined in each node, and, in such a case, the channel of each node is reset to CHc thereby allowing to reestablish a session.

To positively reestablish a session in this manner indicates that if an abnormality occurs in a transmission path, an abnormal channel is not used and the establishment of session is automatically repeated until a proper channel has been found. Such a structure is advantageous in avoiding obstructions due to cable damages in a multicable having a multichannel structure and due to interfering electromagnetic waves to a particular channel according to the broad band system.

In the case where a transmitter/receiver is provided not for the exclusive use by the control channel CHc but to be shared with the data transferring channel CHx, if a session is set between the nodes N1 and N2 for a long period of time, another third node cannot establish a session with any one of these two during such time period. Besides, it cannot be determined as to whether these nodes N1 and N2 are in the down condition. In order to avoid the occurrence of such a condition, the following measure may be taken.

That is, there is preferably provided a function for prohibiting the session between the nodes N1 and N2 to continue more than a predetermined time period. For this purpose, upon establishment of a session, i.e., upon establishing the channel of the transmitter/receiver to CHx, the transmission/reception channel is positively reset after elapsing a predetermined time period at each of the nodes N1 and N2. In this case, if the third node keeps calling either one of the nodes N1 and N2 through the control channel CHc and the node N1 or node N2 has received the first packet, that node N1 or N2 which has received the first packet can establish a session with the third node. Moreover, the BUSY state, in which the nodes N1 and N2 are in communication, can be apprised to the third node. If the third node does not provide a request of communication with either of node N1 or N2, another session is established between the nodes N1 and N2 thereby allowing to continue communication therebetween.

With the provision of such a means for positively resetting the session between nodes after elapsing a predetermined time period, in the case where the selection of data transferring channels is carried out at random, even if the traffic condition of any particular channel is temporarily overloaded, since the reestablishment of channel is carried out after a predetermined time period, there is an advantage in that the load comes to be evenly distributed. As set forth before, in the present invention, it is so structured that the transmission/reception channels at both of the nodes N1 and N2 are positively reset to CHc at the time when the session has been completed upon termination of data transfer on a packet by packet basis between the nodes N1 and N2. With the provision of an upper limit in the length of time in one session, the above-described advantages may be attained.

Figure 6:
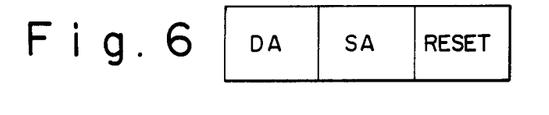
FIG. 6 is a schematic illustration showing the format of a reset packet.

As a method for resetting the transmission/reception channel of each of the nodes N1 and N2 to CHc, in order to implement this reset operation rapidly, for example, a reset packet RESET-PKT as shown in FIG. 6 is transmitted to the other node in communication, and the node, which has transmitted that reset packet RESET-PKT, resets its transmission/reception channel to CHc after its transmission; whereas, the node, which has received the reset packet RESET-PKT, resets its transmission/reception channel to CHc after its reception. In this case, similarly with the case shown in FIG. 3, the reset operation may be carried out using the channel designating packet CHc-PKT which designates the channel CHc.

In the case where the transmitter/receiver of each channel is not dedicated only for the control channel CHc but is shared with the data transferring channel CHx, while a session is present between the nodes N1 and N2, even if a third node sends out a first packet to these nodes N1 and N2 so as to establish a session with them, no response is obtained. Thus, the third node which supplied a request for communication will know the fact that these nodes N1 and N2 are in either the BUSY or down state, but it cannot be determined which of the nodes N1 and N2 is, in fact, in such a state. In this case, it is true that a response may be obtained from the node N1 or N2 by terminating or temporarily interrupting the session after elapsing a predetermined time period as described previously, but such a response may not be obtained always depending on the timing of transmitting the first packet from the third node so that there is a chance that another session is established between the nodes N1 and N2 again. Accordingly, it takes time to determine which of the nodes N1 and N2, to which a communication is desired by the third node, is in the BUSY or down state. There is a scheme which can apprise the third node of the fact that the nodes N1 and N2 are in an active state, i.e., the nodes N1 and N2 being in the BUSY state and not in the down state.

Figure 7:
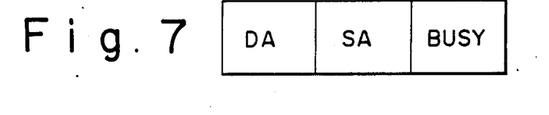
FIG. 7 is a schematic illustration showing the format of a busy packet.

In this case, as shown in FIG. 7, a busy packet BUSY-PKT with its destination address DA being set to a global address is transmitted from the nodes N1 and N2 whose transmission/reception channels have been reset to CHc, and thus the fact that the nodes N1 and N2 are in the BUSY condition (or READY condition) is apprised to the third node which is in a CHc channel receptive condition. Here, if the session between the nodes N1 and N2 is not to be preferentially selected or the session has been completed, the ready packet READY-PKT may be transmitted instead of the busy packet BUSY-PKT. Alternatively, instead of indicating the BUSY or READY state, that packet may be a presence indicating packet which indicates the fact that an access of node N1 or N2 is simply present on the channel CHc which has been reset.

Figure 8:
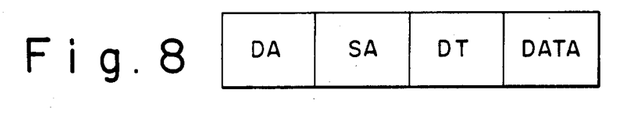
FIG. 8 is a schematic illustration showing the format of a short data packet.

As described above, the multiaccess communication system in accordance with the present invention is particularly advantageous in the case where a session type data communication is to be carried out, i.e., the amount of data to be transferred per communication being larger and thus the overall amount of data to be handled being extremely large. However, there is a case in which the amount of data to be transferred is extremely small (e.g., approximately 1 byte) and a case where data transfer is carried out sporadically. If such data transfer is to be carried out with switching of channels as described above, the transmission efficiency becomes rather poor. For this reason, in the case where the amount of data to be transferred is extremely small, the data to be entered into the data packet PKT1 which is to be transmitted after establishment of the data transferring channel CHx between the nodes N1 and N2 is directly transmitted as the first packet from the node N1 to the node N2 through the control channel CHc. In this case, upon receipt of this short data packet, the node N2 handles the data in its information section as the data transferred from the node N1. In this case, the procedure of transmitting the acknowledge packet ACK-PKT to the node N1 in response to the reception of the short data packet by the node N2 may be omitted. FIG. 8 shows the format of the short data packet. It is to be noted that "DT" in FIG. 8 indicates a control field for data transfer.

In the above-described embodiment, the nodes N1 and N2 have a transmitter/receiver unit (here, this corresponds to a combination of the channel selector 4 and the packet transmitter/receiver 3 which is not dedicated for the control channel CHc but which is shared by the data transferring channel CHx. It is to be noted, however, that the present system may be expanded such that a plurality of transmitter/receiver units are provided in each node.

Figure 9:
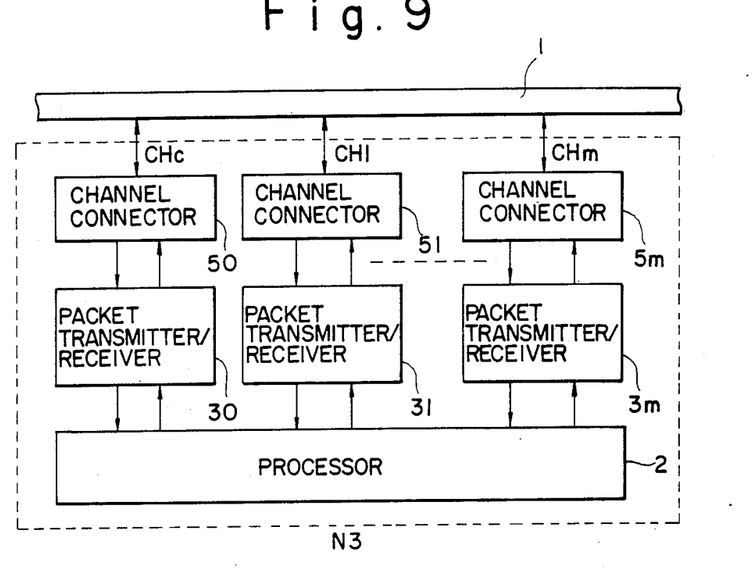
FIGS. 9 through 12 are block diagrams showing other embodiments of the present invention.

FIG. 9 shows one embodiment of such an expanded system, in which a node N3 includes a packet transmitter/receiver 30 connected to the common communication path 1 through a channel connector 50 dedicated for the control channel CHc and a plurality of packet transmitter/receivers 31-3m which are connected to the common communication path 1 through channel connectors 51-5m, respectively, which fixedly access the data transferring channels CHx, where x=1—m. It is to be noted that each of the channel connectors 50-5m serves to fixedly connect the corresponding one of the packet transmitter/receivers 30-3m to the corresponding one of the channels in the common communication path 1.

The node N3 having such a structure is most suitable for such elements as file server, print server and central computer which are required to have a plurality of sessions with other nodes at the same time. That is, in such an event, the data transferring channel CHx is designated through the control channel CHc with other nodes, and while the fundamental operation for setting the data transferring channel to the designated channel CHx is identical as described previously, there is no need to provide means for switching channels at all in this case, and, in particular, with the provision of the packet transmitter/receiver 30 dedicated for the control channel CHc, a new request for session from another node can be accepted while a session with a particular node is in progress. Such a new request for session is transmitted through the control channel CHc as the first packet, and since the packet transmitter/receiver 30 always monitors the control channel CHc, it can receive the request any time and establish a data transferring channel other than the channel currently in session.

The data transferring channel CHx in this case may be set at random from a plurality of channels CH1 - CHm under control of the processor 2, or in accordance with the priority determined by the expected use rate of load rate of each channel. There may be only one data transferring channel, in which case sessions may be had with other nodes by carrying out a multiaccess operation on the single data transferring channel.

Figure 10:
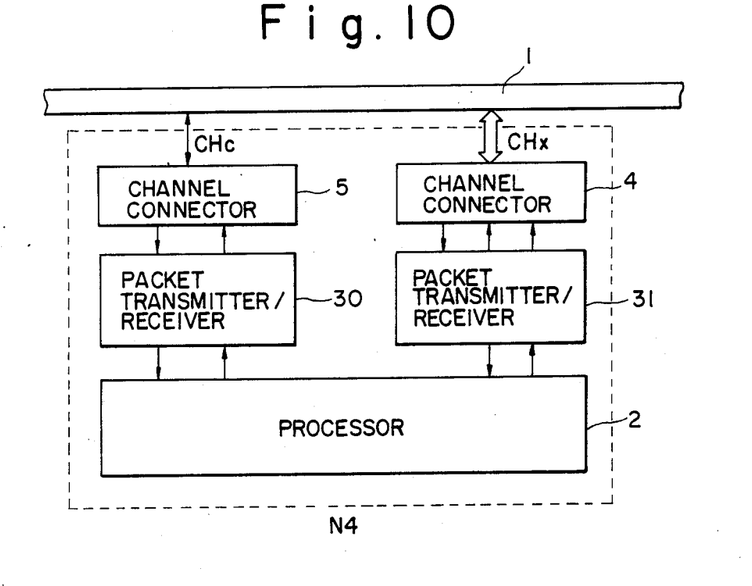

FIG. 10 shows a further embodiment of the present invention, in which case a node N4 includes a dedicated packet transmitter/receiver 30 exclusive for the control channel CHc, which is connected to the common transmission path 1 through a channel connector 5, and a packet transmitter/receiver 31 for data transfer which is connected to the common transmission path 1 through a channel selector 4, which, in turn, carries out switching of the data transferring channel CHx. With this structure, in a case where a plurality of nodes having a server function are provided and the channel selection is carried out freely at random and not in a fixed manner with groups of channels, the channel setting for the first session in a node having a certain server function is carried out at random, but it may be so structured that the channel for the second and the following sessions be set at the channel of the first session. Even in this channel selection method, if the number of server groups is large, the load at each of the data transferring channels may be evenly distributed statistically by using random numbers.

Figure 11:
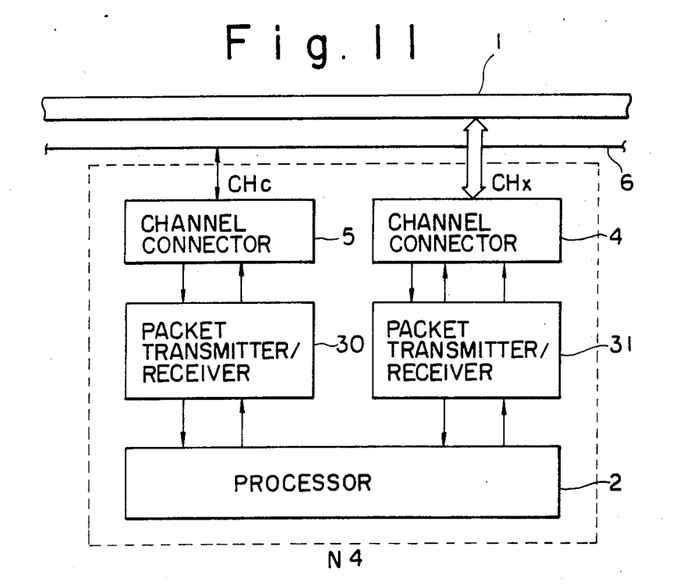

FIG. 11 shows a still further embodiment of the present invention, in which case there is provided an exclusive transmission cable 6 for use with the control channel CHc separately from the common transmission path 1. It is to be noted that the node N4 connected to the common transmission path 1 and to the cable 6 is identical to that provided in the system of FIG. 4. The control channel CHc is used every time when a session is to be established between nodes, and, thus, if the setting and release of session occurs so often or the total number of nodes is extremely large, it is probable that the total transmission capacity of the control channel CHc becomes insufficient or the transmission delay increases. If the control channel CHc malfunctions, it could lead to a failure of total system, so that it requires a high reliability. Under the circumstances, with the provision of the independent cable for the control channel CHc, the transmission delay at high traffic condition may be maintained small and it is possible to increase the speed of only the control channel CHc, whereby the Token method and the like may be applied as the access method in the control channel CHc.

Figure 12:
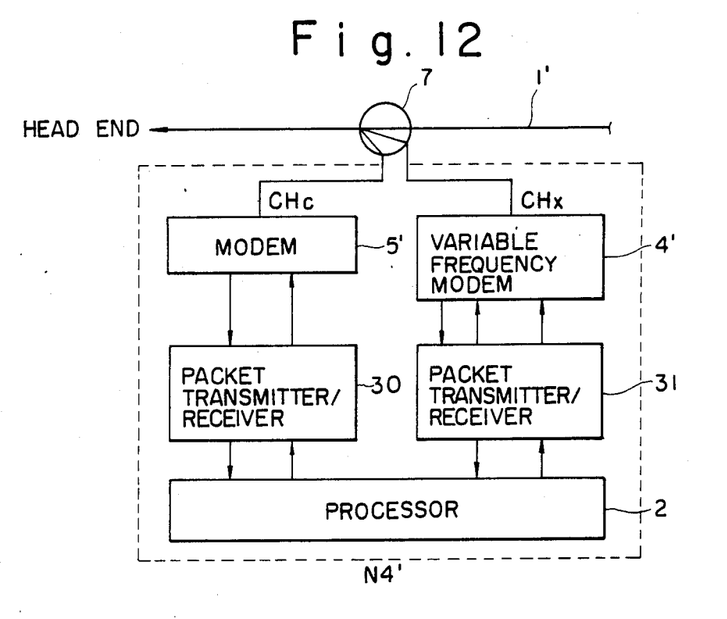

FIG. 12 shows a still further embodiment of the present invention, which is basically the same in structure as that shown in FIG. 10 with the application of the broad band method using a single cable as a common transmission path 1'. The structure of FIG. 12 includes a node N4' which is fundamentally the same in structure as the node N4 of FIG. 10, but the node N4' includes a MODEM 5' dedicated for the control channel CHc in place of the channel connector in the node N4 of FIG.

10. The node N4' of FIG. 12 also includes a variable frequency MODEM 4' capable of varying the data transferring channel CHx by varying the carrier frequency in place of the channel selector 4 of FIG. 10. These MODEMs 4' and 5' are connected to the common transmission path 1' through a directional coupler 7. The variable frequency MODEM 4' may be so structured that the frequency of a local oscillator in a superheterodyne receiver is variable, and use is often made of a frequency synthesizer using a PLL so as to make the frequency of the local oscillator variable.

In the broad band method, there may be provided a relatively large number of low-speed channels with the application of the frequency multiplex communication, and, thus, it is effective in the application of the present invention. When reconstructing each of the structures shown in FIGS. 1, 9 and 11 with the application of the broad band method, the channel selector 4 may be replaced by the variable frequency MODEM 4' and the channel connector 5 (50-5m) may be replaced by the MODEM 5'.

Similarly with the case of FIG. 1, in each of the system structure of FIG. 9 or FIG. 12, it is to be noted that the fundamental operation for designating the data transferring channel CHx through the control channel CHc with other nodes and setting the data transferring channel to the thus designated channel CHx is identical to what has been described previously. However, in the nodes N1 and N2, in which the transmitter/receiver is shared by the control channel CHc and the data transferring channel CHx, either one of the control and data transfer modes can only be established at a time; however, in the nodes N3, N4 and N4', in which there is provided a separate transmitter/receiver dedicated to the control channel CHc, even if the data transferring channel CHx has been set with a certain node thereby establishing the data transfer mode, there can be established the control mode at the same time for accepting a request for session from another node through the control channel CHc. Accordingly, a plurality of links may be established at the same time.

Thus, in the nodes N1 and N2, it is necessary to switch to the control mode by resetting to the control channel CHc as described before in order to establish a new session at the time of detecting an abnormality in data transfer or at the time of completion of data transfer. On the other hand, in the nodes N3, N4 and N4', it is not necessary to switch to the control mode at the time of detecting an abnormality in data transfer and the time of completion of data transfer, and, instead, the data transfer mode is released. Also in this case, for example, when an abnormality in data transfer in the node N3 has been detected, a packet for releasing the data transfer mode for the link with the node in question is transmitted. If the node in question is the node N1, then the data transfer mode releasing packet is the reset packet RESET-PKT or control channel designating packet CHc-PKT. It should also be noted that the data transfer made for the corresponding link is released in response to the session end packet END-PKT which is supplied at the end of the data communication.

As described above, in accordance with the multiaccess communication system of the present invention, there is provided an exclusive control channel common to each of the nodes in a network having a multichannel structure and a channel to be used for data transfer is set through exchanging of a channel selecting packet in advance via the control channel between selected nodes to carry out transmission and reception of data therebetween. Therefore, even if the transmission line capacity increases, packet communications can be carried out at high efficiency in the multichannel structure.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. In a multiaccess communication method, when a data communication is to be carried out among a plurality of nodes which are connected to a common transmission path having a multichannel structure using a packet, a channel selecting means switches to a selected channel by exchanging packets for selecting a data transferring channel in advance between nodes, between which a data communication is desired, through a dedicated control channel which is allocated commonly to each of said nodes such that it establishes a reception accepting condition whenever said nodes have no session.

2. The multiaccess communication method of claim 1 wherein, for the selection of a channel, a first node transmits a channel designating packet designating a channel to be used to a second node and said second node, which has received said channel designating packet, returns an acknowledge packet.

3. The multiaccess communication method of claim 1 wherein, for the selection of a channel, a first node transmits a channel designating packet designating a channel to be used to a second node and, if the channel designated by said first node is not usable at said second node, which has received said channel designating packet, then said second node returns a channel alteration designating packet designating an alteration to a usable channel to said first node.

4. The multiaccess communication method of claim 1 wherein, for the selection of a channel, a first node transmits a channel designating packet designating a channel to be used to a second node and said second node, which has received said channel designating packet, returns the same channel designating packet with an indication of permission of reception.

5. The multiaccess communication method of claim 1 wherein, for the selection of a channel, a first node transmits a channel request packet requesting a usable channel to a second node and said second node, which has received said channel request packet, returns a channel designating packet designating a channel to be used.

6. The multiaccess communication method of claim 1 wherein the selection of a channel is carried out at random.

7. The multiaccess communication method of claim 1 wherein the channels are grouped according to service classes of data communication and the selection of a channel is carried out after selecting a particular channel group.

8. The multiaccess communication method of claim 1 wherein the selection of the channel is carried out with a priority being applied to the use of a channel according to service classes of data communication.

9. The multiaccess communication method of claim 1 wherein a communication of short data is carried out through the control channel.

10. A multiaccess communication system comprising:
a common communication path having a multichannel structure including a dedicated control channel and data transmitting channels;
a plurality of nodes each of which is connected to said common communication path for carrying out a data communication using packets between selected ones thereof;
wherein at least one of said plurality of nodes includes channel selecting means for switching to a selected channel by exchanging predetermined packets for selecting a data transmitting channel in advance between nodes, between which a data communication is desired, through said control channel which is commonly allotted to each of said plurality of nodes so as to establish a reception accepting condition at all times whenever said nodes have no session; and means for resetting to said control channel upon detection of an abnormality in data communication in said transmitting channel.

11. The multiaccess communication system of claim 10 wherein one of said nodes, which has detected an abnormality in data communication, transmits a reset packet to the other node in communication.

12. The multiaccess communication system of claim 10 wherein one of said nodes, which has detected an abnormality in data communication, transmits a control channel designating packet to the other node in communication.

13. The multiaccess communication system of claim 10 wherein the node which has been reset to the control channel transmits a packet for apprising its reset state to other nodes.

14. A multiaccess communication system comprising:
a common communication path having a multichannel structure;
a plurality of nodes each of which is connected to said common communication path for carrying out a data communication using packets between selected ones thereof;
wherein at least one of said plurality of nodes includes channel selecting means for switching to a selected channel by exchanging predetermined packets for selecting a data transmitting channel in advance between nodes, between which a data communication is desired, through a dedicated control channel which is commonly allotted to each of said plurality of nodes so as to establish a reception accepting condition at all times whenever said nodes have no session; and means for resetting to said control channel upon detecting the fact that a data communication time period has exceeded a predetermined value.

15. The multiaccess communication system of claim 14 wherein one of said nodes, which has detected the fact that the data communication time period has exceeded the predetermined value, transmits a reset packet to the other node in communication.

16. The multiaccess communication system of claim 14 wherein one of said nodes, which has detected the fact that the data communication time period has exceeded the predetermined value, transmits a control channel designating packet to the other node in communication.

17. The multiaccess communication system of claim 14 wherein the node which has been reset to the control channel transmits a packet apprising its reset state to other nodes.

18. A multiaccess communication system comprising:
a common communication path having a multichannel structure;
a plurality of nodes each of which is connected to said common communication path for carrying out a data communication using packets between selected ones thereof;
wherein at least one of said plurality of nodes includes channel selecting means for switching to a selected channel by exchanging predetermined packets for selecting a data transmitting channel in advance between nodes, between which a data communication is desired, through a dedicated control channel which is commonly allotted to each of said plurality of nodes so as to establish a reception accepting condition at all times whenever said nodes have no session; and means for resetting a node to said dedicated control channel in response to a session end packet which is supplied at the completion of data communication.

19. The multiaccess communication system of claim 18 wherein the node which has been reset to the control channel transmits a packet apprising its reset state to other nodes.

20. A multiaccess communication system comprising:
a common communication path having a multichannel structure;
a plurality of nodes each of which is connected to said common communication path for carrying out a data communication using packets between selected ones thereof;
wherein each of at least some of said plurality of nodes includes a first transmitter/receiver unit dedicated for a dedicated control channel allocated commonly to each of said nodes so as to maintain a reception accepting condition at all times, a plurality of second transmitter/receiver units each of which is dedicated to a corresponding one of a number of data transferring channels for use in data transfer, and means for selecting a data transferring channel by exchanging predetermined packets in advance between nodes, between which a data communication is desired, through said first transmitter/receiver unit dedicated for the control channel to thereby establish a link with the node to which communication is to be made, through one of said plurality of second transmitter/receiver units which corresponds to said selected channel.

21. The multiaccess communication system of claim 20 wherein, for the selection of a channel, a first node transmits a channel designating packet designating a channel to be used to a second node, and said second node, which has received said channel designating packet, returns an acknowledge packet.

22. The multiaccess communication system of claim 20 wherein, for the selection of a channel, a first node transmits a channel designating packet designating a channel to be used to a second node, and, if the channel designated by said first node is not usable at said second node, which has received said channel designating packet, then said second node returns a channel alteration designating packet designating an alteration to a usable channel to said first node.

23. The multiaccess communication system of claim 20 wherein, for the selection of a channel, a first node transmits a channel designating packet designation a channel to be used to a second node, and said second node, which has received said channel designating packet, returns the same channel designating packet with an indication of permission for reception.

24. The multiaccess communication system of claim 20 wherein, for the selection of a channel, a first node transmits a channel request packet requesting a channel to be used to a second node, and said second node, which has received said channel request packet, returns a channel designating packet designating a channel to be used.

25. The multiaccess communication system of claim 20 wherein the selection of a channel is carried out at random.

26. The multiaccess communication system of claim 20 wherein channels are grouped according to service classes of data communication, and the selection of a channel is carried out after selecting a particular channel group.

27. The multiaccess communication system of claim 20 wherein the selection of a channel is carried out with a priority being applied to the use of a channel according to service classes of data communication.

28. The multiaccess communication system of claim 20 wherein a packet communication of short data is carried out through the control channel.

29. The multiaccess communication system of claim 20 wherein the control channel is provided as an exclusive communication path separate from the common communication path.

30. A multiaccess communication system comprising:
a common communication path having a multichannel structure;
a plurality of nodes each of which is connected to said common communication path for carrying out a data communication using packets between selected ones thereof;
wherein each of at least some of said plurality of nodes includes a first transmitter/receiver unit dedicated for a dedicated control channel allocated commonly to each of said nodes so as to maintain a reception accepting condition at all times, a plurality of second transmitter/receiver units each of which is dedicated to a corresponding one of a number of data transferring channels for use in data transfer, means for selecting a data transferring channel by exchanging predetermined packets in advance between nodes, between which a data communication is desired, through said first transmitter/receiver unit dedicated for the control channel to thereby establish a link with the node to which communication is to be made, through one of said plurality of second transmitter/receiver units which corresponds to said selected channel, and means for detecting an abnormality in data communication in the data transfer channel to which said link has been established and releasing a data transfer mode in the corresponding link.

31. The multiaccess communication system of claim 30 wherein one of said nodes, which has detected an abnormality in data communication, transmits a packet indicating a release of data transfer mode in the corresponding link to the node in communication.

32. A multiaccess communication system comprising:
a common communication path having a multichannel structure;
a plurality of nodes each of which is connected to said common communication path for carrying out a data communication using packets between elected ones thereof;
wherein each of at least some of said plurality of nodes includes a first transmitter/receiver unit dedicated for a dedicated control channel allocated commonly to each of said nodes so as to maintain a reception accepting condition at all times, a plurality of second transmitter/receiver unites each of which is dedicated to a corresponding one of a number of data transferring channels for use in data transfer, means for selecting a data transferring channel by exchanging predetermined packets in advance between nodes, between which a data communication is desired, through said first transmitter/receiver unit dedicated for the control channel to thereby establish a link with the node to which communication is to be made, through one of said plurality of second transmitter/receiver units which corresponds to said selected channel, and means for releasing a data transfer mode in the corresponding link in response to a session end packet which is supplied upon completion of data communication.

33. A multiaccess communication system comprising:
a common communication path having a multichannel structure;
a plurality of nodes each of which is connected to said common communication path for carrying out a data communication using packets between selected ones thereof;
wherein each of at least some of said plurality of nodes includes a transmitter/receiver unit dedicated to a dedicated control channel allocated commonly to each of said nodes so as to maintain a reception accepting condition at all times, and channel selecting means for switching to a selected channel by exchanging predetermined packets for selecting a data transferring channel in advance between nodes, between which a data communication is desired, through said transmitter/receiver dedicated to the control channel.

34. The multiaccess communication system of claim 33 wherein, for the selection of a channel, a first node transmits a channel designating packet designating a channel to be used to a second node, and said second node, which has received said channel designating packet, returns an acknowledge packet.

35. The multiaccess communication system of claim 33 wherein, for the selection of a channel, a first node transmits a channel designating packet designating a channel to be used to a second node, and, if the channel designated by said first node is not usable at said second node, which has received said channel designating packet, then said second node returns a channel alteration designating packet designating an alteration to a usable channel to said first node.

36. The multiaccess communication system of claim 33 wherein, for the selection of a channel, a first node transmits a channel designating packet designating a channel to be used to a second node, and said second node, which has received said channel designating packet, returns the same channel designating packet with an indication of permission for reception.

37. The multiaccess communication system of claim 33 wherein, for the selection of a channel, a first node transmits a channel request packet requesting a channel to be used to a second node, and said second node, which has received said channel request packet, returns a channel designating packet designating a channel to be used.

38. The multiaccess communication system of claim 33 wherein the selection of a channel is carried out at random.

39. The multiaccess communication system of claim 33 wherein channels are grouped according to service classes of data communication, and the selection of a channel is carried out after selecting a particular channel group.

40. The multiaccess communication system of claim 33 wherein the selection of a channel is carried out with a priority being applied to the use of a channel according to service classes of data communication.

41. The multiaccess communication system of claim 33 wherein a packet communication of short data is carried out through the control channel.

42. The multiaccess communication system of claim 33 wherein the control channel is provided as an exclusive communication path separate from the common communication path.

43. A multiaccess communication system comprising:
a common communication path having a multichannel structure;
a plurality of nodes each of which is connected to said common communication path for carrying out a data communication using packets between selected ones thereof;
wherein each of at least some of said plurality of nodes includes a transmitter/receiver unit dedicated to a dedicated control channel allocated commonly to each of said nodes so as to maintain a reception accepting condition at all times, channel selecting means for switching to a selected channel by exchanging predetermined packets for selecting a data transferring channel in advance between nodes, between which a data communication is desired, through said transmitter/receiver dedicated to the control channel, and means for releasing a data transfer mode in the corresponding link upon detection of an abnormality in data communication in the selected data transfer channel.

44. The multiaccess communication system of caim 43 wherein one of said nodes, which has detected an abnormality in data communication, transmits a packet for releasing a data transfer mode in the corresponding link in the opposite node in communication.

45. A multiaccess communication system comprising:
a common communication path having a multichannel structure;
a plurality of nodes each of which is connected to said common communication path for carrying out a data communication using packets between selected ones thereof;
wherein each of at least some of said plurality of nodes includes a transmitter/receiver unit dedicated to a dedicated control channel allocated commonly to each of said nodes so as to maintain a reception accepting condition at all times, channel selecting means for switching to a selected channel by exchanging predetermined packets for selecting a data transferring channel in advance between nodes, between which a data communication is desired, through said transmitter/receiver dedicated to the control channel, and means for releasing a data transfer mode in the corresponding link in response to a session end packet which is supplied upon completion of data communication.

* * * * *